(12) United States Patent
Lueck et al.

(10) Patent No.: US 11,945,591 B2
(45) Date of Patent: Apr. 2, 2024

(54) AIRCRAFT PASSENGER SEAT HAVING A MOVABLY MOUNTED SEAT BASE

(71) Applicant: ZIM Aircraft Seating GmbH, Immenstaad am Bodensee (DE)

(72) Inventors: Sebastian Lueck, Schwerin (DE); Uwe Salzer, Friedrichshafen (DE)

(73) Assignee: ZIM Aircraft Seating GmbH, Immenstaad am Bodensee (DE)

( * ) Notice: Subject to any disclaimer, the term of this patent is extended or adjusted under 35 U.S.C. 154(b) by 91 days.

(21) Appl. No.: 17/061,681

(22) Filed: Oct. 2, 2020

(65) Prior Publication Data
US 2021/0179274 A1 Jun. 17, 2021

Related U.S. Application Data

(63) Continuation of application No. PCT/EP2019/058792, filed on Apr. 8, 2019.

(30) Foreign Application Priority Data

Apr. 9, 2018 (DE) ..................... 10 2018 108 351.3

(51) Int. Cl.
*B64D 11/06* (2006.01)

(52) U.S. Cl.
CPC ...... *B64D 11/0639* (2014.12); *B64D 11/0696* (2013.01)

(58) Field of Classification Search
CPC ............. B64D 11/0639; B64D 11/064; B64D 11/0641; B64D 11/0642
USPC ........................................ 297/340, 342, 343
See application file for complete search history.

(56) References Cited

U.S. PATENT DOCUMENTS

| 349,063 | A | 9/1886 | Shepard |
|---|---|---|---|
| 2,374,848 | A | 5/1945 | Wohlk |
| 2,627,898 | A | 2/1953 | Jackson |
| 3,019,050 | A | 1/1962 | Spielman |
| 3,224,808 | A | 12/1965 | Spielman |
| 3,329,463 | A | 7/1967 | Zimmermann |
| 3,572,829 | A | 3/1971 | Malitte |

(Continued)

FOREIGN PATENT DOCUMENTS

| CN | 104085756 A | 10/2014 |
|---|---|---|
| DE | 80 25 516 U1 | 1/1981 |

(Continued)

OTHER PUBLICATIONS

English translation of International Preliminary Report on Patentability (Chapter I) (Application No. PCT/EP2019/058792) dated Oct. 22, 2020, 9 pages.

(Continued)

*Primary Examiner* — Philip J Bonzell
*Assistant Examiner* — Colin Zohoori
(74) *Attorney, Agent, or Firm* — BURR PATENT LAW, PLLC

(57) ABSTRACT

The invention relates to an aircraft passenger seat, comprising a frame intended to be fastened to a floor of an aircraft passenger cabin, a seat base movably mounted on the frame, and a movably mounted seat back. The aircraft passenger seat is characterized in that at least one rail is fastened to the frame and in that the seat base is slidably arranged on the rail by means of guide elements.

13 Claims, 5 Drawing Sheets

(56) References Cited

U.S. PATENT DOCUMENTS

| | | | |
|---|---|---|---|
| 4,452,486 A | 6/1984 | Zapf et al. | |
| 2003/0025371 A1 | 2/2003 | Vencruso | |
| 2004/0036336 A1* | 2/2004 | Veneruso | B64D 11/064 297/184.14 |
| 2005/0077761 A1* | 4/2005 | Dryburgh | A47C 1/0352 297/68 |
| 2006/0103203 A1* | 5/2006 | Williamson | A47C 17/22 297/283.3 |
| 2010/0201172 A1 | 8/2010 | Hudswell et al. | |
| 2012/0038196 A1 | 2/2012 | Lawson | |
| 2012/0139300 A1* | 6/2012 | Marais | B64D 11/064 297/340 |
| 2014/0300161 A1* | 10/2014 | Beroth | B64D 11/06 297/340 |
| 2017/0021930 A1* | 1/2017 | Henshaw | B64D 11/064 |
| 2017/0313213 A1 | 11/2017 | Meister et al. | |
| 2018/0086468 A1* | 3/2018 | Beroth | B64D 11/06395 |
| 2019/0152606 A1* | 5/2019 | De La Garza | B64D 11/064 |
| 2020/0047890 A1* | 2/2020 | Simpson | B64D 11/0641 |
| 2020/0262561 A1* | 8/2020 | Verny | B64D 11/0691 |

FOREIGN PATENT DOCUMENTS

| | | |
|---|---|---|
| DE | 10 2015 111 844 A1 | 1/2017 |
| EP | 1 057 725 A2 | 12/2000 |
| GB | 593542 A | 10/1947 |
| WO | 01/12464 A1 | 2/2001 |

OTHER PUBLICATIONS

German Search Report (Application No. 10 2018 108 351.3) dated Mar. 22, 2019.

International Search Report and Written Opinion (Application No. PCT/EP2019/058792) dated Jun. 17, 2019.

English translation of a Chinese Office Action dated Aug. 31, 2023 (Application No. 201980037201.X).

\* cited by examiner

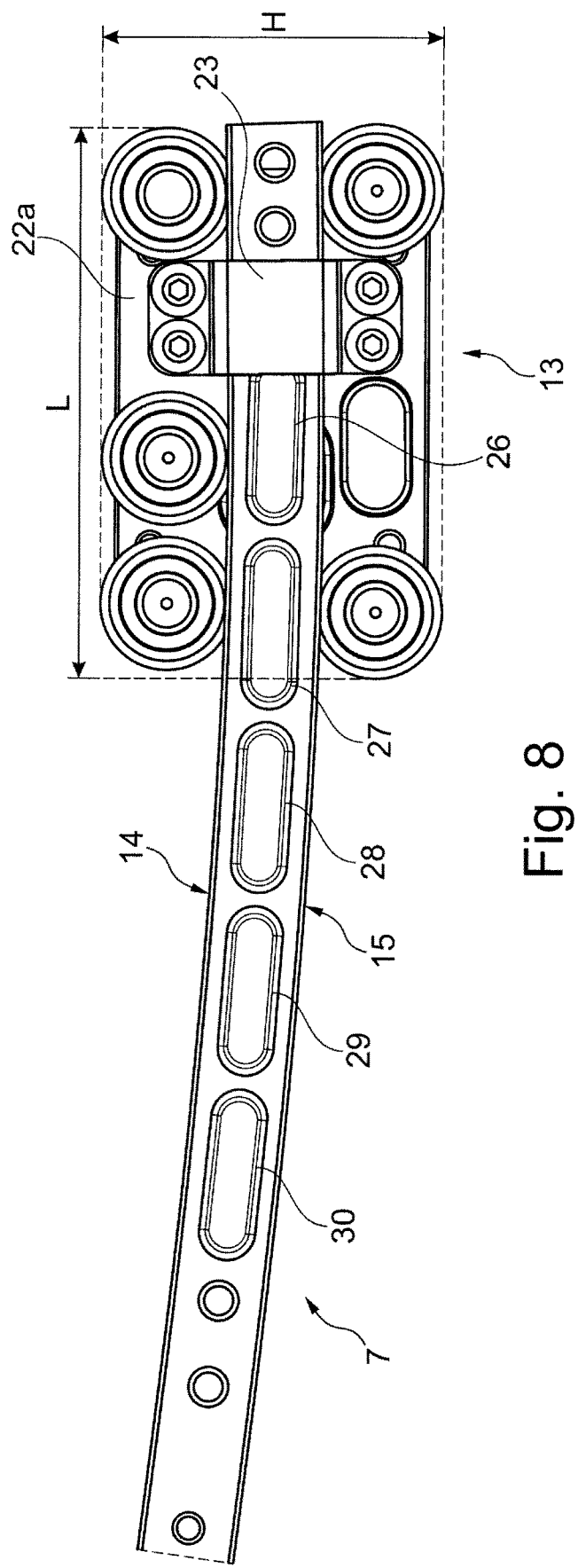
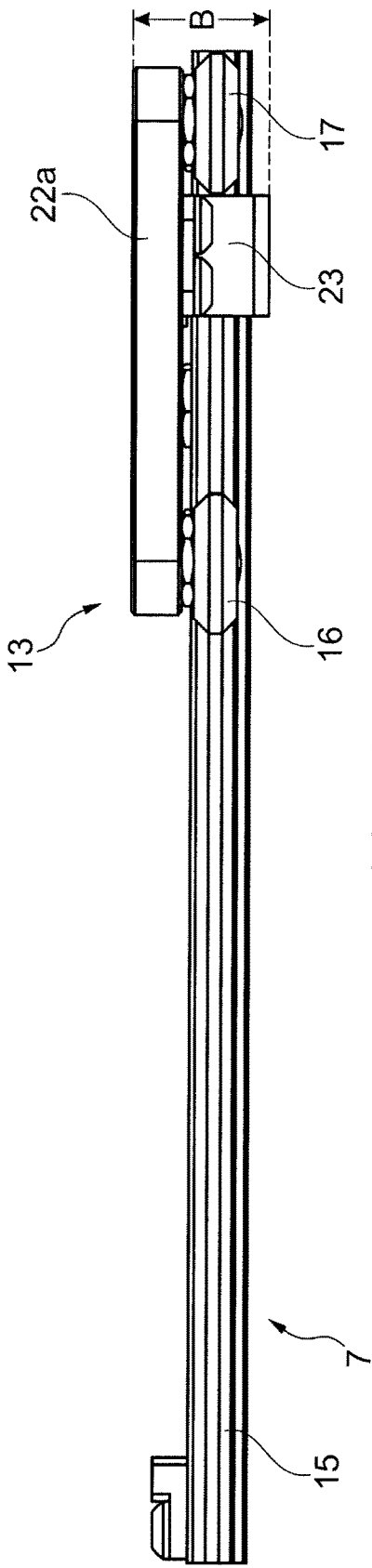
Fig. 8
Fig. 9

AIRCRAFT PASSENGER SEAT HAVING A MOVABLY MOUNTED SEAT BASE

FIELD OF THE INVENTION

The present invention relates to a aircraft passenger seat having a movably mounted seat base.

BACKGROUND OF THE INVENTION

Aircraft passenger seats with one or more seating places are known in a multiplicity of embodiments for the equipping of passenger aircraft, in particular, of long haul aircraft. A seating place has a seat base and usually also a backrest, it being possible for virtually all the different seat positions to be set at a seating place of an aircraft passenger seat by way of positional changes of the seat base, the backrest and frequently the two parts. As a result, passengers can change at will between relatively active sitting postures in an "upright position", for example, for consumption of meals, and relatively passive sitting postures in a "reclined position", for example, in order to relax and sleep. In particular, various solutions are known for coupling movements of the seat base and the backrest to one another mechanically. As a result, seat settings can be specified which interfere as little as possible, for example, with the movement space, what is known as the "living space" of adjacent aircraft passengers, in particular, in a seat row arranged behind.

On account of the requirement in aviation for seat devices to be configured to be as light as possible and to utilize the available "living space" of a user as fully as possible, the construction of aircraft passenger seats which can be adjusted comfortably and are at the same time stable represents a special challenge.

SUMMARY OF THE INVENTION

It is an object of the present invention to provide an improved adjustable aircraft passenger seat which, in particular, provides a comparatively improved, for example larger, "living space" and, for example, is of more stable and/or simpler construction.

The present invention proceeds from an aircraft passenger seat with a frame, the frame being provided for fastening to a floor of an aircraft passenger cabin, and with a seat base which is movably mounted on the frame, and a movably mounted backrest.

Directional references which are mentioned in the following text advantageously refer to the seating direction of the aircraft seat.

The frame advantageously comprises an, in particular, fixed enclosure of the backrest. The enclosure is configured, for example, as a backrest shell. For example, an extent of the aircraft passenger seat, for example, counter to a seating direction, is fixed, in particular, unchangeably, in a rear region by way of the backrest shell.

In the region of its upper edge, in particular, the backrest is advantageously mounted movably on the frame of the aircraft passenger seat, for example, on the backrest shell. The backrest is preferably mounted in such a way that the backrest can carry out a pivoting/displacement movement, in particular, together with the seat base. The backrest is preferably mounted movably, for example, so as to be movable with a pivoting or swinging action or, for example, so as to be displaceable on at least one rail or an articulated lever.

The core concept of the present invention can be seen in the fact that at least one rail is fixed on the frame, and that the seat base is arranged on the rail such that it can be displaced via guide mechanisms. As a result, an adjustment of the aircraft seat, in particular, of the seat base and/or the backrest, for example, a force to be applied for the adjustment, is made comparatively easier for a user.

The seat base is arranged such that it can advantageously be displaced via the guide means, in particular, to and fro in the seating direction and/or transversely with respect to the seating direction, for example, downward and upward.

The rail is advantageously configured as a guide body which is, in particular, elongate. The cross section of the rail is present, for example, in an L-shaped, U-shaped, round, oval or rectangular, for example, square, manner. The rail is, for example, of rod-shaped configuration, for example, as a round tube or as a square tube. For example, the rail is manufactured from aluminum.

In the mounted state, the rail preferably has a cross section, the height of which is greater than the width thereof.

In order to save weight, the rail advantageously has window openings, for example, in the form of cutouts or through holes, over a large part of its length.

The rail is, for example, between 200 mm and 350 mm in length. The length of the rail lies, for example, in a range between 200 mm and 320 mm, for example, between 220 mm and 280 mm, for example, between 230 mm and 260 mm. For example, the rail is approximately 250 mm, in particular, approximately 253 mm in length. The length of the rail advantageously extends transversely with respect to the cross section of the rail.

In cross section, the rail has, for example, a height of between 12 mm and 20 mm, in particular, of between 14 mm and 18 mm. The height of the rail is, for example, precisely 14 mm, 14.5 mm, 15 mm, 15.5 mm, 16 mm, 17 mm, 17.5 mm or 18 mm, in particular, precisely 16.5 mm. In cross section, the rail has, for example, a width of between 6 mm and 12 mm, in particular, of between 8 mm and 10 mm. The width of the rail is, for example, approximately 8 mm, 8.5 mm, 9 mm, 9.5 mm or approximately 10 mm.

It is proposed, furthermore, that two rails are provided. Precisely two rails are preferably provided. The rails are mounted on the seat base, in particular, on the left and on the right, for example, on the left and on the right in or on the edge region of the seat base, for example, underneath the seat base.

Moreover, it proves to be advantageous that the rail has a guide track for the guide means.

The guide mechanisms are mounted, in particular, such that they can be displaced on the guide track in such a way that, in the case of a movement, the seat base carries out a pivoting/displacement movement on a curved path. The guide track is preferably curved. The guide track is advantageously configured in such a way that the guide mechanisms are mounted on the guide track in a self-centering manner. For example, the guide track is of groove-like configuration, for example, as a guide groove.

It also proves to be advantageous that the seat base and the backrest are connected to one another in an articulated manner. The seat base is advantageously coupled to the backrest via a pivoting pin in the rear region of the seat base and in the lower region of the backrest. In this way, for example, in the case of a pivoting/displacement movement of the seat base, the backrest likewise carries out a pivoting/displacement movement. It is also conceivable, however, that the aircraft passenger seat is configured in such a way that a movement of the seat base is decoupled from a movement of the backrest.

In one advantageous variant of the aircraft passenger seat, the at least one rail is arranged below the seat base. For example, two or more rails, in particular, precisely two rails, are arranged below the seat base. The rails preferably run in parallel and are, for example, of identical configuration, in particular, are of mirror-symmetrically identical configuration. The rails are preferably arranged on the frame in a mirror-symmetrical manner.

Moreover, it is advantageous that the guide mechanisms comprise a roller carriage. In particular, the guide mechanisms comprise two roller carriages for two rails, for example, one roller carriage for each rail.

It is also advantageous that a plurality of rollers are arranged on the roller carriage. In this way, the seat base is mounted movably in a manner which is stable against tilting on the guide comprising the rail, the guide mechanism and the roller carriage.

For example, the roller carriage comprises at least two, three, four or five rollers. As the number of rollers increases, stable guidance on the at least one rail can be improved.

A roller advantageously has a circular contour. The roller is present, for example, in the form of a wheel. It is also conceivable that the roller is of cylindrical or spherical configuration. The rollers are advantageously mounted rotatably on the roller carriage. A roller is preferably of circumferentially concave or convex configuration. For example, a rolling face of the roller, by way of which rolling face the roller is mounted on the guide track of the rail, is present in a curved or bent manner, for example, in a concave and/or convex manner, as viewed in the direction of a rotational axis of the roller. A circumferential surface is advantageously adapted to a contour of the guide track of the rail.

It is also proposed that the at least one rail has guide tracks which lie opposite one another. The guide tracks are configured, in particular, in such a way that rollers of the guide mechanisms can roll on them.

Rollers of the guide mechanisms, which rollers lie opposite one another, in particular, in a prestressed manner and roll on the guide tracks are provided on guide tracks which lie opposite one another. Taut and stable guidance of a roller carriage on the rail, and therefore of the seat base, can be realized by way of prestressed rollers. At least in each case two rollers which lie opposite one another are advantageously provided.

The roller carriage has a length of from 30 mm to 40 mm, of from 40 mm to 50 mm, of from 50 mm to 60 mm, of from 70 mm to 80 mm, of from 80 mm to 90 mm or of 100 mm to 110 mm. In particular, the length L of the roller carriage lies in a range of from 30 mm to 120 mm, for example, in a range of from 60 mm to 120 mm. The height H of the guide carriage preferably lies in a range of from 30 mm to 70 mm, for example, in a range of from 50 mm to 70 mm, in particular, at approximately 60 mm. The roller carriage is preferably approximately 100 mm, in particular, approximately 97 mm in length. Along its length, the roller carriage extends, for example, in an extent between a rolling face of a first roller to a rolling face of a further roller of the roller carriage. The roller carriage extends, for example, in a width B in a range between 16 mm and 25 mm, for example, between 20 mm and 24 mm. The width of the roller carriage is, for example, approximately 20 mm, 20.5 mm, 21 mm, 21.5 mm, 22 mm, 23 mm, 23.5 mm or 24 mm, in particular, 22.5 mm.

The rollers of the roller carriage are advantageously mounted on one side on a plate of the roller carriage, in particular, for ball bearings and/or anti-friction bearings. The roller carriage advantageously engages around the guide rail completely. For example, the roller carriage encloses the guide rail in a direction transversely with respect to a longitudinal extent of the guide rail, in particular, completely. That section of a wraparound means which lies on the inside on the rails preferably extends in terms of its length along the rail, for example, as viewed in the longitudinal extent of the rail, only over at most half the complete roller carriage. In particular, that section of the wraparound mechanism which lies on the inside on the rails is of U-shaped configuration, in particular, is bent in a U-shaped manner. The wraparound mechanism advantageously extends around the rail from that plate of the roller carriage which is advantageously present on an outer section of the rail, in particular along the cross section of the rail.

In this way, there is the possibility that a roller carriage can move over the complete length of a rail, and nevertheless a mounting capability for the rail on the remaining seat frame is made possible on, for example, one side of the rail, optionally the inner side of the rail, without a disruption of the movement of the roller carriage over the complete length or virtually complete length of the rail being caused.

Mounting of the rail on the frame preferably takes place in the respective end region of the rail.

Moreover, it is proposed that at least one guide track on the rail is concave. A concave guide track allows reliable guidance of a roller which rolls in it and preferably has a bulged rolling face which fits said concave guide track. It is also conceivable that a guide track is of convex configuration, and a roller which fits it and has, for example, an indented rolling face is advantageously provided.

In the case of two concave guide tracks which lie opposite one another or in the case of two convex guide tracks which lie opposite one another, it can also be achieved in this way that a roller carriage which is pushed onto the guide tracks along the guide rails is stabilized against lateral movement on the guide rail in the pushed-on state, in the case, in particular, of rollers which are prestressed so as to lie opposite one another, and, in particular, cannot be pulled off laterally from the guide rail. Merely extending or retracting along the guide rails, in particular, in the direction of a longitudinal extent of the rail, is preferably possible from the guide tracks.

In one advantageous modification of the aircraft passenger seat, rollers of a roller carriage which is arranged displaceably together with the seat base on the at least one rail are prestressed on the rail. As a result, the roller carriage is held on the rail in a flexible manner. As a result, manufacturing tolerances are also advantageously compensated for, in particular, in the case of a movement of the roller carriage along the rail.

It likewise proves to be an advantage that rollers of a roller carriage which is arranged displaceably together with the seat base on the at least one rail are mounted by way of ball bearing and/or anti-friction bearing. The displacement effort by way of a user in the case of the movement of the seat base can be kept comparatively small as a result of ball bearings and/or anti-friction bearings. All the rollers are preferably mounted by ball bearing and/or anti-friction bearing.

It also proves to be advantageous that the at least one rail has a guide track which is curved in such a way that the seat base can be moved forward and upward. The movement forward and upward is to be considered, in particular, in relation to the seating direction. For example, the rail is present in a curved manner, and the seat base is attached to the rail by means of the roller carriage, in such a way that, starting from a first position of the seat base, the seat base carries out a pivoting movement forward and upward with a front seat edge. For example, the rail is present in a curved manner, and the seat base is attached to the rail by means of the roller carriage, in such a way that, starting from the first position of the seat base, the seat base carries out a pivoting movement forward and downward with a rear seat edge. The rear seat edge is advantageously configured so as to lie opposite the front seat edge.

For example, in the arranged state on the frame, the rail is present so as to run upward with at least one end. In the arranged state on the frame, the rail is preferably configured so as to run in the direction of the seat base with one end, in particular, with the two ends.

It is also advantageous that the at least one rail is mounted on two supporting tubes of the frame which are spaced apart.

Holders of the rail for mounting on the supporting tubes are attached, in particular, to a longitudinal side of a rail in such a way that guide mechanisms can move on the opposite longitudinal side in a manner which is not disrupted by holders. In particular, the holders are adapted to material sections of the guide mechanisms, which material sections are situated on the same side, in such a way that rollers which are connected to the mounting mechanism on the opposite side can utilize the entire longitudinal region, or virtually the entire longitudinal region, of the rail in the case of a rolling movement. Stop elements are optionally provided at the ends of the rails, such that the guide mechanisms cannot move beyond the rail. Otherwise, practically the complete length of the rail is available for a movement of the guide mechanisms. A displacement movement in a range of 95%, 90%, 85%, 80% of the length of the rail is optionally possible.

In one advantageous refinement of the aircraft passenger seat, the aircraft passenger seat comprises an adjusting mechanism on the backrest, the adjusting mechanism being configured between the backrest and the enclosure of the backrest, with the result that the backrest and, in particular, the seat base which is coupled to the backrest can be moved by means of the adjusting mechanism.

For example, the backrest is connected to the enclosure such that it can be moved by means of the articulated lever. The aircraft passenger seat advantageously comprises two articulated levers. For example, in each case one articulated lever is configured to the right and to the left of the backrest. The articulated lever can advantageously be moved pivotably at a first bearing point on the backrest, in particular, is mounted in a rotationally movable manner, and is mounted at a second bearing point on the enclosure in a pivotably movable, in particular, rotationally movable manner. The bearing points are arranged, for example, in a stationary manner on the backrest and/or in a stationary manner on the enclosure. As a result, a movement of the backrest relative to the enclosure is limited. The articulated lever is connected to the backrest, for example, on a side region of the backrest.

The adjusting mechanism comprises, for example, a damping element, for example, a hydraulic damper or a pneumatic damper. The adjusting mechanism comprises, for example, a hydraulic cylinder or a pneumatic cylinder. For example, the adjusting mechanism comprises a drive element, for example, a mechanical actuator, for example, a spring and/or an electric motor.

The adjusting mechanism is advantageously coupled, in particular connected, to the backrest, in particular, by way of a first end in the region of the upper edge of the backrest. For example, the adjusting mechanism is coupled to the enclosure by way of a second end in a middle region of the enclosure of the backrest. For example, the adjusting mechanism is fixed on the enclosure in a pivotably movable manner.

The adjusting mechanism is preferably present in such a way that a movement of the backrest and, for example, of the seat base from an "upright position" into a "reclined position" of the aircraft passenger seat is damped by way of the adjusting mechanism, and/or a movement, in particular, in the opposite direction, of the backrest and, for example, of the seat base from a "reclined position" into an "upright position" is driven by way of the adjusting mechanism.

The adjusting mechanism advantageously comprises a securing member, by means of which a position of the damping element and/or of the drive element can be set, in particular, can be fixed. As a result, the aircraft passenger seat, in particular, the backrests and, for example, the seat base, can be set, in particular, can be fixed, in a position, for example in the "upright position". The securing member is configured, for example, as a locking element.

In the "upright position", an aircraft passenger seated on the aircraft passenger seat is advantageously situated in an upright position. The aircraft passenger is to be in the upright position, for example, in the case of a take-off or landing of an aircraft, in which the aircraft passenger seat is arranged. In the "reclined position", an aircraft passenger seated on the aircraft passenger seat is advantageously situated in a more lying position which the aircraft passenger can assume, for example, during the cruise between take-off and landing.

BRIEF DESCRIPTION OF THE DRAWINGS

In the following text, one exemplary embodiment of the present invention will be described in greater detail on the basis of the diagrammatic drawings, and further advantages will be mentioned.

FIGS. 6 to 9 show a rail with a roller carriage of the aircraft passenger seat according to FIG. 1 in various views.

DETAILED DESCRIPTION OF THE INVENTION

Figure 1:
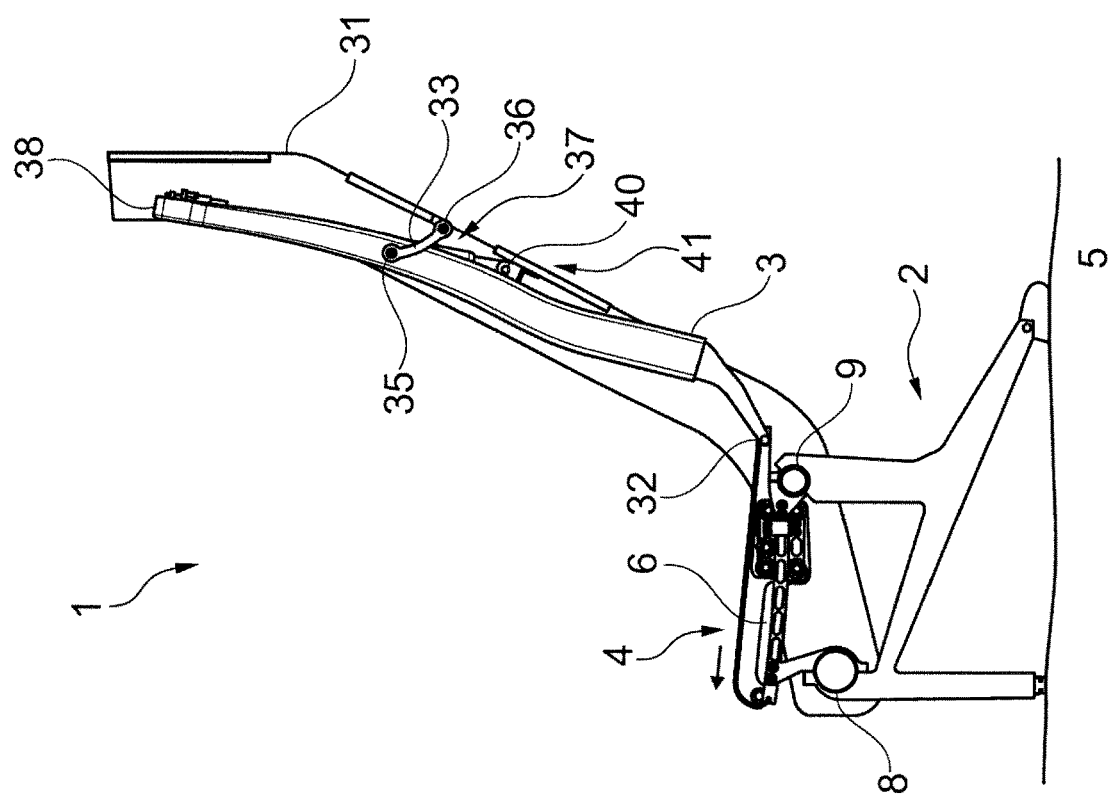
FIG. 1 shows a side view of an aircraft passenger seat according to the present invention in a first position.

FIG. 1 shows an aircraft passenger seat 1 according to the present invention with a frame 2, a backrest 3 and a seat base 4. In the mounted state in an aircraft, the aircraft passenger seat 1 is advantageously fastened via the frame 2 to a cabin floor 5 of an aircraft cabin.

Figure 2:
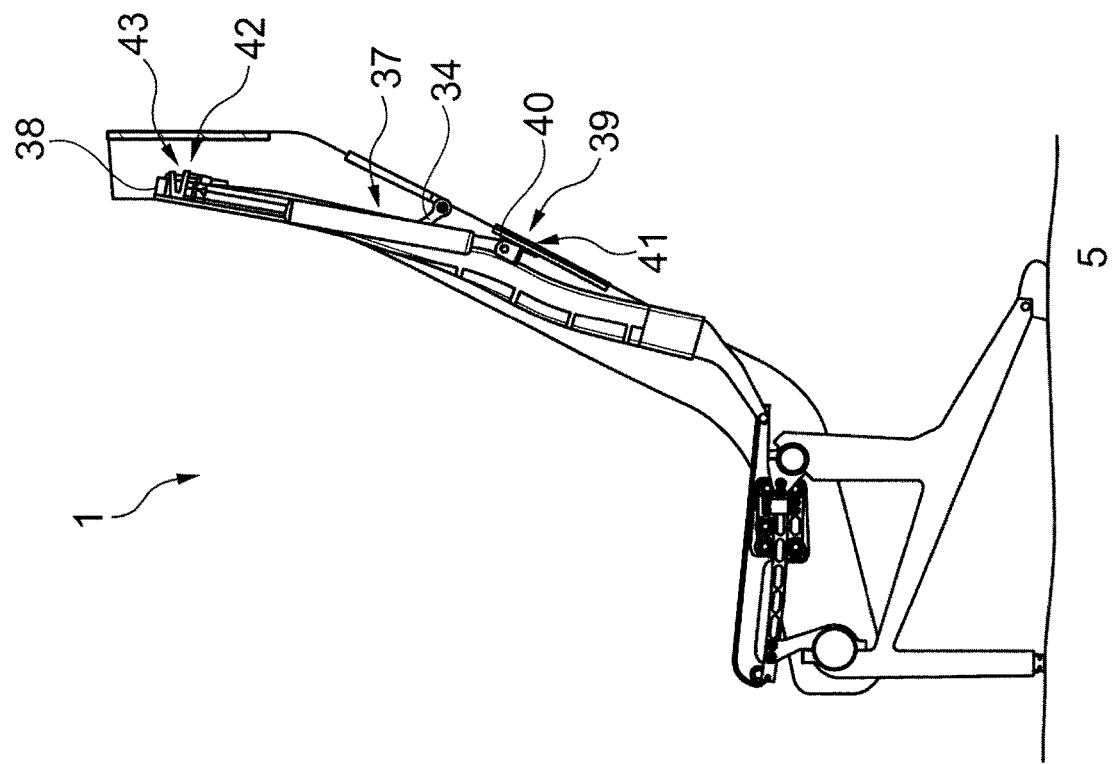
FIG. 2 shows a side view of the aircraft passenger seat according to FIG. 1, parts of the backrest being shown in a transparent manner.
Figure 4:
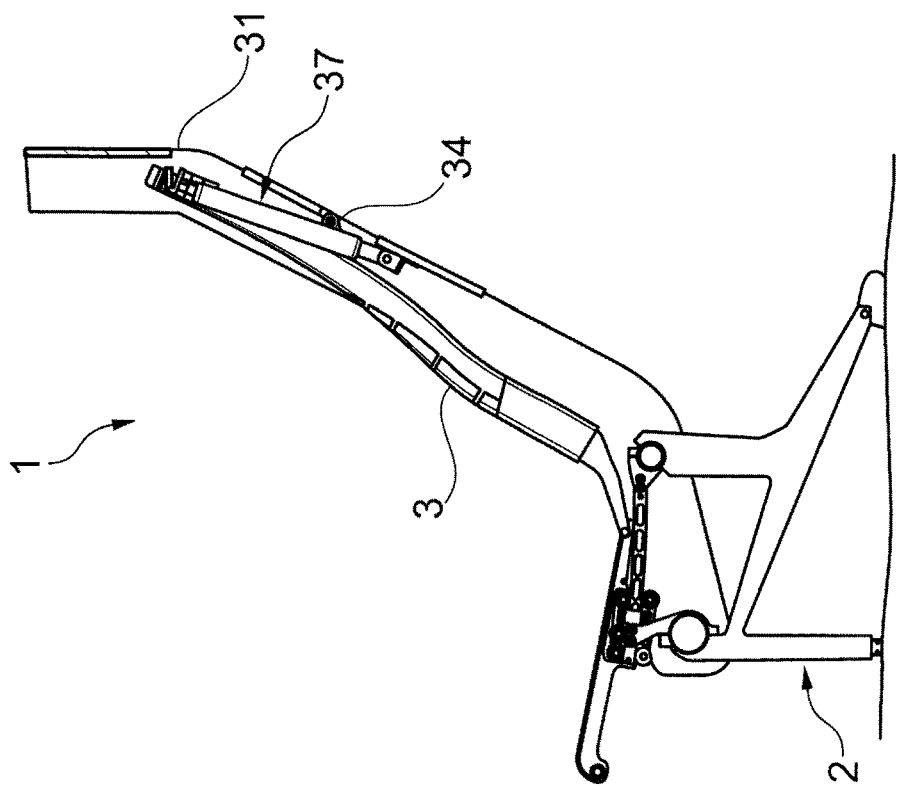
FIG. 4 shows a side view of the aircraft passenger seat according to FIG. 1 in the position according to FIG. 3, parts of the backrest being shown in a transparent manner.
Figure 3:
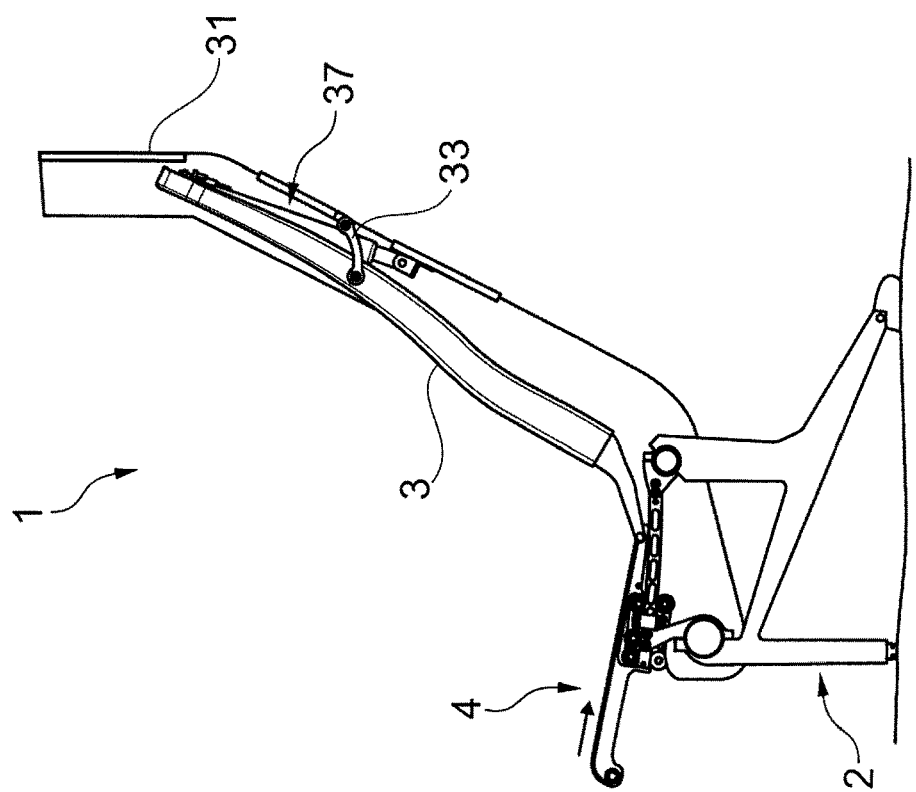
FIG. 3 shows a side view of the aircraft passenger seat according to FIG. 1 in a further position
Figure 5:
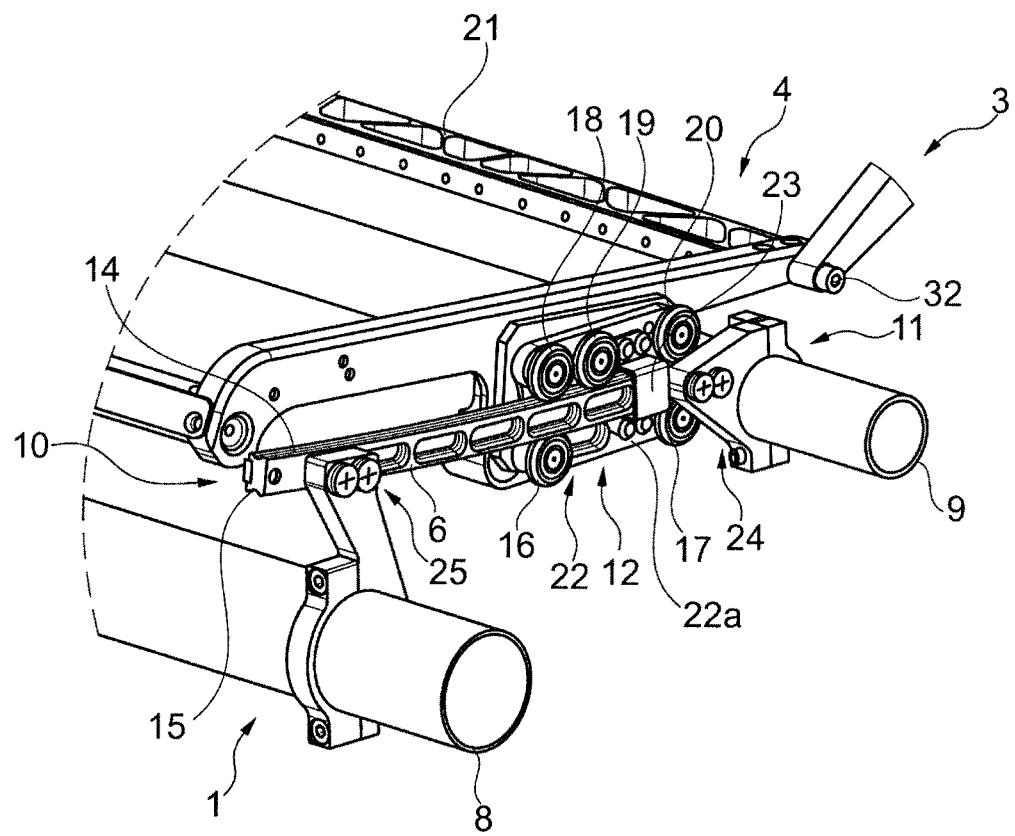
FIG. 5 shows a detail of the aircraft passenger seat according to FIG. 1 in a perspective view obliquely from the side at the top and front.
Figure 10:
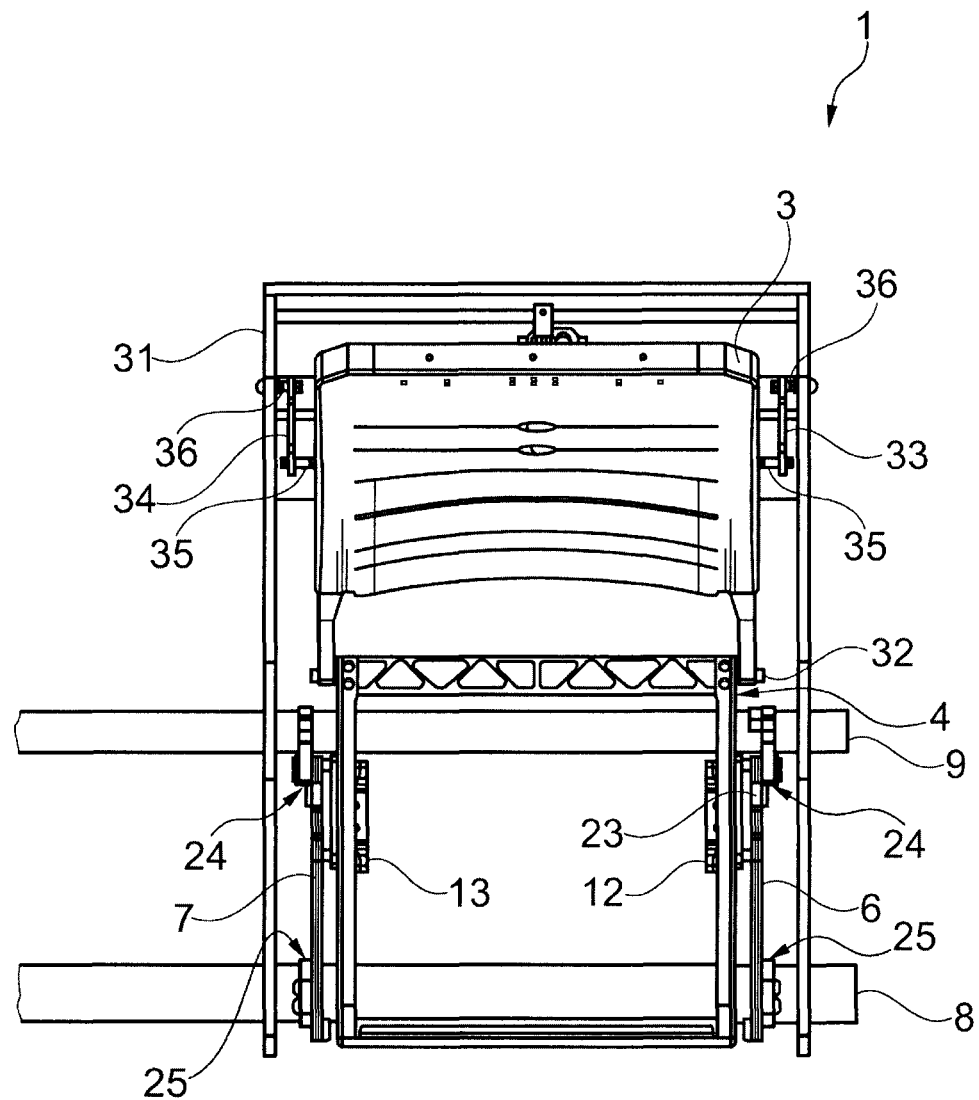
FIG. 10 shows a plan view from above of the aircraft passenger seat according to FIG. 1.

FIGS. 1, 2 and 10 show the aircraft passenger seat 1 in an "upright position", and FIGS. 3 and 4 show it in a "reclined position".

Rails 6, 7 are configured on the frame 2, by means of which rails 6, 7 the seat base 4 is arranged movably on the frame 2 (FIGS. 1 to 5 and 10). For weight reduction, in particular, the rails 6, 7 advantageously comprise window openings 26 to 30 (FIG. 8). The rails 6, 7 are fastened to supporting tubes 8, 9 on the frame 2. The supporting tubes 8, 9 are preferably present on the frame 2 so as to run transversely with respect to a seating direction of the aircraft passenger seat 1. For example, the supporting tubes 8, 9 connect two or more aircraft passenger seats 1. The aircraft passenger seats 1 are coupled by way of the supporting tubes 8, 9, for example, in order to form an aircraft passenger seat row. For example, the rails 6, 7 are connected in each case by way of a first end 10 to a first supporting tube 8 and by way of a second end 11 to the second supporting tube 9. For example, the rail 6, 7 runs below the supporting tubes 8, 9 in the arranged state on the frame 2. The rails 6, 7 are advantageously mounted on the frame 2 in such a way that a seat frame 21 of the seat base 4 is present between the rails 6, 7 as viewed in a longitudinal extent of the supporting tubes 8, 9. As a result, the seat base 4 is arranged on the frame 2 with a comparatively flat design height.

Figure 6:
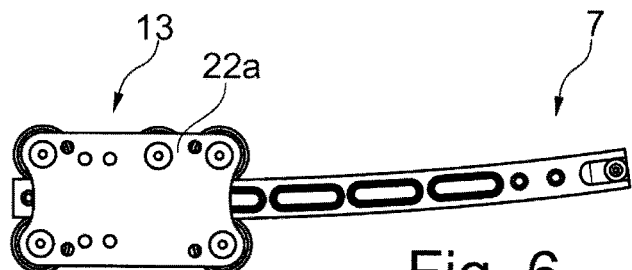
Figure 7:
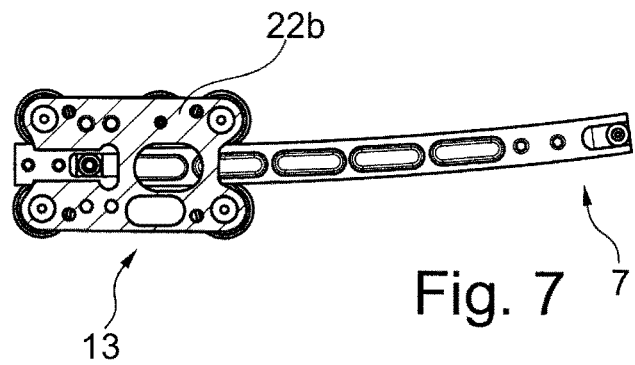

Guide mechanisms in the form of a roller carriage 12, 13 are arranged on the seat base 4, by way of which guide mechanisms of the seat base 4 is guided movably along guide tracks 14, 15 of the rails 6, 7. A roller carriage 12, 13 advantageously comprises a plurality of rollers, in particular, precisely five rollers 16 to 20. A roller carriage 12, 13 advantageously comprises a plate 22, on which the rollers 16 to 20 are mounted rotatably. Two different plate variants 22a, 22b of the plate 22 are depicted in FIGS. 6 and 7.

Furthermore, the roller carriage 12, 13 preferably comprises a wraparound mechanism 23 which is fixed on the plate 22, with the result that, in the arranged state of the roller carriage 12, 13 on the rail 6, 7, the roller carriage 12, 13 engages around the rail 6, 7 at least along a cross section of the rail 6, 7. The wraparound mechanism 23 of the roller carriage 12, 13 extends in the longitudinal extent of the rails 6, 7, for example, over a smaller distance than an overall length of the roller carriage 12, 13. As a result, the roller carriage 12, 13 can preferably roll over approximately the entire length of the guide tracks 14, 15 of the rails 6, 7. Furthermore, the wraparound mechanism 23 advantageously forms a stop element as a result, which stop element bears against stopping elements 24, 25 on the end regions 10, 11 of the rails 6, 7, with the result that the roller carriage 12, 13 is held on the rail 6, 7. For example, attachment elements form the stopping elements 24, 25, the attachment elements connecting the rail 6, 7 to the supporting tubes 8, 9.

The roller carriage 12, 13 advantageously extends in a length L, a height H and a width B (see FIGS. 8 and 9).

The guide tracks 14, 15 are of concave configuration, for example, transversely with respect to a longitudinal extent of the rails 6, 7. The guide track 14, 15 is present, for example, in a groove-like manner. As a result, the roller carriage 12, 13, in particular, the rollers 16 to 20 of the roller carriage 12, 13, is/are held or stabilized on the guide track 14, 15 with respect to transverse forces. As viewed in the longitudinal extent of the rails 6, 7, for example, the upper guide track 14 is present in a concavely upwardly curved manner, and the lower guide track 15 is, for example, likewise of upwardly curved but outwardly convex configuration.

The seat base 4 is present in a positionally fixed, in particular, rigid manner relative to the roller carriage 12, 13, in particular, with respect to the plate 22 of the roller carriage 12, 13. It is also conceivable that the seat base 4 is attached to the roller carriage 12, 13 such that it can be moved, for example, can be moved rotationally, relative to the roller carriage 12, 13.

Furthermore, the seat frame 2 comprises, for example, an enclosure 31. The enclosure 31 forms, for example, a backrest shell or an overall enclosure of the aircraft passenger seat. The overall enclosure encloses the aircraft passenger seat, for example, at least on the sides and at the rear.

The backrest 3 is advantageously connected, in particular, in a pivotable manner, to the seat base 4 via a pivoting pin 32. Furthermore, the backrest 3 is connected movably to the enclosure 31, for example, by means of articulated levers 33, 34. The articulated levers 33, 34 are coupled, for example, at a first bearing point 35 to the backrest 3 and at a second bearing point 36 to the enclosure 31. Moreover, an adjusting mechanism 37 can be present between the backrest 3 and the enclosure 31. The adjusting mechanism 37 is configured, for example, in the form of a hydraulic cylinder which advantageously has both a damping function and a driving function. The adjusting mechanism 37 is arranged on the enclosure 31, for example, by way of a first end 41 in a middle region 39 between a seat base 4 and an upper edge 38 of the backrest 3. The adjusting mechanism 37 is fastened, for example, pivotably to a bearing 40 on the enclosure 31. At a second end 42 of the adjusting mechanism 37, the adjusting mechanism 37 is advantageously arranged on the backrest 3, in particular, in a movable manner in the region of the upper edge 38. The first and the second end 41, 42 of the adjusting mechanism 37 are advantageously present on the adjusting mechanism 37 such that they lie opposite one another and are spaced apart. Furthermore, the adjusting mechanism 37 preferably comprises a locking element 43, by means of which, for example, a position of the adjusting mechanism 37 can be locked. As a result, the aircraft passenger seat 1 is held, for example, in the "upright position" (see FIGS. 1 and 2). If a user of the aircraft passenger seat 1 actuates the aircraft passenger seat 1, if, for example, the user unlocks the position of the adjusting mechanism 37, the seat base 4 can be moved forward and upward along the guide tracks 14, 15 of the rails 6, 7, in particular, by way of the user, with the result that the aircraft passenger seat 1 is situated at the end of the movement of the seat base 4 in a "reclined position" in accordance with FIGS. 3 and 4.

LIST OF DESIGNATIONS

1 Aircraft passenger seat
2 Frame
3 Backrest
4 Seat base
5 Cabin floor
6, 7 Rail
8, 9 Supporting tube
10, 11 End
12, 13 Roller carriage
14, 15 Guide track
16-20 Roller
21 Seat frame
22 Plate
22a, 22b Plate
23 Embracing mechanism
24, 25 Stopping element 26-30 Window opening
31 Enclosure
32 Pivoting pin
33, 34 Articulated lever
35, 36 Bearing point
37 Adjusting mechanism
38 Upper edge
39 Region
40 Bearing
41, 42 End
43 Locking element

The invention claimed is:

1. An aircraft passenger seat comprising:
a frame for fastening to a floor of an aircraft passenger cabin;
a seat base mounted movably on the frame;
a backrest, which is movably mounted with the frame and which comprises a backrest enclosure configured as a backrest shell surrounding and enclosing at least an uppermost part of the backrest, so that the backrest is encased within the backrest enclosure in any position of the backrest; and
an adjusting mechanism arranged on the backrest, between the backrest and the backrest enclosure and encased within the backrest enclosure, wherein the adjusting mechanism includes a damping element coupled to the backrest by way a first end in a region of the upper edge of the backrest and coupled to the backrest enclosure by way of a second end in a middle region of the backrest enclosure,
wherein at least one rail is fixed on the frame,
wherein the seat base is arranged on the at least one rail such that the seat base can be displaced via guide mechanisms,
wherein the seat base and the backrest are connected to one another in an articulated manner, whereby the backrest and the seat base coupled to the backrest can be moved together by the adjusting mechanism, and
wherein the backrest is movably and directly connected to the backrest enclosure by at least one articulated lever.

2. The aircraft passenger seat as claimed in claim 1, wherein two rails are provided.

3. The aircraft passenger seat as claimed in claim 1, wherein the at least one rail has a guide track for the guide mechanisms.

4. The aircraft passenger seat as claimed in claim 1, wherein the at least one rail is arranged below the seat base.

5. The aircraft passenger seat as claimed in claim 1, wherein the guide mechanisms comprise a roller carriage.

6. The aircraft passenger seat as claimed in claim 5, further comprising a plurality of rollers arranged on the roller carriage.

7. The aircraft passenger seat as claimed in claim 6, wherein the rollers of the roller carriage, which is arranged displaceably together with the seat base on the at least one rail, are prestressed on the at least one rail.

8. The aircraft passenger seat as claimed in claim 7, wherein the rollers of the roller carriage, which is arranged displaceably together with the seat base on the at least one rail, are mounted by way of a ball bearing and/or an anti-friction bearing.

9. The aircraft passenger seat as claimed in claim 1, wherein the at least one rail has guide tracks which lie opposite one another.

10. The aircraft passenger seat as claimed in claim 9, wherein at least one guide track on the at least one rail is concave.

11. The aircraft passenger seat as claimed in claim 1, wherein the at least one rail has a guide track which is curved in such a way that the seat base can be moved forward and upward.

12. The aircraft passenger seat as claimed in claim 1, wherein the at least one rail is mounted on two supporting tubes of the frame which are spaced apart.

13. The aircraft passenger seat as claimed in claim 1, wherein the backrest is movably and directly connected to the backrest enclosure by a plurality of articulated levers.

* * * * *